United States Patent
Masel et al.

(10) Patent No.: US 6,453,801 B1
(45) Date of Patent: Sep. 24, 2002

(54) APPLIANCE FOR COOKING FOOD ARTICLES

(76) Inventors: Ruben Masel, 16/24 Hazabar Street, 55 410, Kiron (IL); George Valdshtein, 14 Eln Hanoch Street, 55 900, Ganei Tikva (IL)

( * ) Notice: Subject to any disclaimer, the term of this patent is extended or adjusted under 35 U.S.C. 154(b) by 0 days.

(21) Appl. No.: 09/761,154

(22) Filed: Jan. 17, 2001

(51) Int. Cl.$^7$ ............................................ A47J 27/00
(52) U.S. Cl. ..................... 99/330; 99/340; 99/404; 99/409; 99/410; 99/443 R; 99/447
(58) Field of Search .................... 99/330, 334, 340, 99/404, 409, 410, 443 R, 447, 450, 415, 418; 426/438, 441, 523

(56) References Cited

U.S. PATENT DOCUMENTS

| | | | |
|---|---|---|---|
| 1,174,559 A | * 3/1916 | Frost | |
| 3,696,735 A | * 10/1972 | Boertje et al. | 99/404 |
| 3,797,377 A | * 3/1974 | Lotter et al. | 99/407 |
| 4,203,357 A | * 5/1980 | Vaussanvin | 99/340 |
| 5,543,166 A | * 8/1996 | Masel et al. | 426/523 |
| 5,611,265 A | * 3/1997 | Ronci et al. | 99/353 |
| 5,967,020 A | * 10/1999 | Soyama et al. | 99/327 |

FOREIGN PATENT DOCUMENTS

EP        0300306 A2 * 1/1989

* cited by examiner

Primary Examiner—Keith Hendricks
Assistant Examiner—Drew Becker
(74) Attorney, Agent, or Firm—G. E. Ehrlich Ltd.

(57) ABSTRACT

A cooking appliance and method for cooking food articles by means of a heated cooking liquid, includes a liquid container for receiving a quantity of the cooking liquid; an electrical heater for heating the cooking liquid; a perforated rotary drum for receiving the food articles to be cooked; and an electrical drive for rotating the rotary drum. The liquid container is selectively movable to a raised position, wherein the cooking liquid therein directly contacts food articles in the drum, or to a lowered position wherein the cooking liquid therein is spaced below the food articles in the drum. The lowered position of the liquid container may be used for steam-heating the food articles, or for pre-heating the food articles before being fried by moving the liquid container to its raised position.

16 Claims, 7 Drawing Sheets

APPLIANCE FOR COOKING FOOD ARTICLES

FIELD AND BACKGROUND OF THE INVENTION

The present invention relates to an appliance and method for cooking food articles, and particularly to such an appliance and method for cooking food articles by means of a heated cooking liquid. The invention is especially useful as an appliance for either frying various types of food articles, such as potatoes and pieces of meat, for steaming food such as rice or vegetables, and/or for popping corn.

Many appliances of this type have been developed and are described in the literature, for example in U.S. Pat. Nos. 4,873,920; 4,901,633; 5,010,805; 5,146,841; 5,165,329; 5,379,684; 5,524,527; 5,543,166; 5,584,234; 5,611,265; and 6,077,555. In most of these appliances, the food articles are completely immersed in hot oil during the frying process, thereby causing them to become soaked in the oil. U.S. Pat. No. 5,543,166 discloses an appliance in which the food articles are tumbled through a small quantity of the frying oil at the bottom of a rotary drum in order to decrease the quantity of oil absorbed by the food articles. However, even with the latter appliance, the food articles still absorb a significant quantity of the oil, in the order of 20%.

OBJECTS AND BRIEF SUMMARY OF THE INVENTION

An object of the present invention is to provide an appliance, and also to method, which may be used for frying food articles while minimizing the quantity of oil absorbed by the food articles.

According to a broad aspect of the present invention, there is provided a cooking appliance for cooking food articles by means of a heated cooking liquid, comprising: a liquid container for receiving a quantity of the cooking liquid; an electrical heater for heating the cooking liquid; a perforated rotary drum for receiving the food articles to be cooked; and a drive for rotating the rotary drum; characterized in that the liquid container is selectively movable to a raised position, wherein the cooking liquid therein directly contacts food articles in the drum, or to a lowered position wherein the cooking liquid therein is spaced below the food articles in the drum.

According to another aspect of the present invention, there is provided a method of cooking food articles comprising introducing the food articles into a drum perforated with openings smaller than the food articles; introducing a cooking liquid in a liquid container below the drum; spacing the drum above the liquid container sufficiently such that the cooking liquid therein does not directly contact any food articles in the drum; and heating the cooking liquid while rotating the drum such that the food articles tumble within the drum while heated by the heat from the cooking liquid and the liquid container.

As will be described more particularly below, such a cooking appliance may be used for both frying food articles and also for steaming food articles.

When the appliance is used for frying food articles, the liquid container is first moved to its lowered position, wherein the cooking liquid therein is spaced below the food articles in the drum. In the lowered position of the liquid container, the heat from the hot oil and the liquid container pre-heats the food articles as they tumble in the drum, thereby raising their temperature such as to reduce the temperature difference between the food articles and the hot oil at the time of initial contact of the food articles with the hot oil. The pre-heating is effected not only by the heat transferred from the hot oil, but also by that transferred from the heated walls of the container. It has been found that this pre-heating substantially reduces the amount of oil absorbed by the food articles, from about 20% as in the previous process, to about 8–11%. It is believed that this result is produced for the following reasons: When the food articles are not pre-heated, there is a large temperature difference between the food articles and the oil at the time of the initial contact with the oil, which cools the relatively small quantity of oil. This delays the formation of a hardened crust by the hot oil, and thereby increases the amount of oil absorbed and retained within the food articles before the crust is formed. On the other hand, when the food articles are pre-heated before immersed in the hot oil, the oil remains hot and therefore immediately forms a crust, which thereby reduces the amount of oil absorbed before the crust is formed.

Such a cooking appliance can also be used for steaming food articles, such as vegetables, rice, etc., by retaining the liquid container in its lowered position, spaced below the bottom of the drum is rotated, so that the food articles tumbling within the drum do not come into direct contact with the liquid (water), but only with the steam thereof.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

The preferred embodiment of the invention illustrated in the drawings is a cooking appliance for use primarily for frying food articles, such as potatoes, pieces of chicken, and the like, but which may also be used for other cooking applications, including steaming food and the like.

The illustrated cooking appliance comprise a housing, generally designated 1, open at its upper end. The upper end is closable by a lid 2 having a handle 3. The lid 2 carries a pair of depending arms 4 for rotatably mounting a drum 5 about a horizontal axis 5a. As will be described below, drum 5 is adapted to receive the articles of food to be fried or steamed. It is perforated with a plurality of openings 5b of a size to retain the food articles within the drum during the rotation of the drum.

A liquid container 6 of slightly larger dimensions than the drum 5 is removably supported within the housing 1 by a supporting member 7 disposed below the container. Supporting member 7 also removably supports a plurality of electrical heater elements 8, such as heater wires, halogen lamps, or the like, below the bottom wall 6a of container 6. A reflector 9 is mounted below the heating elements for reflecting the heat generated by the heating elements towards the bottom wall 6a of the liquid container. The outer surface of bottom wall 6a may be blackened for this purpose.

Figure 1:
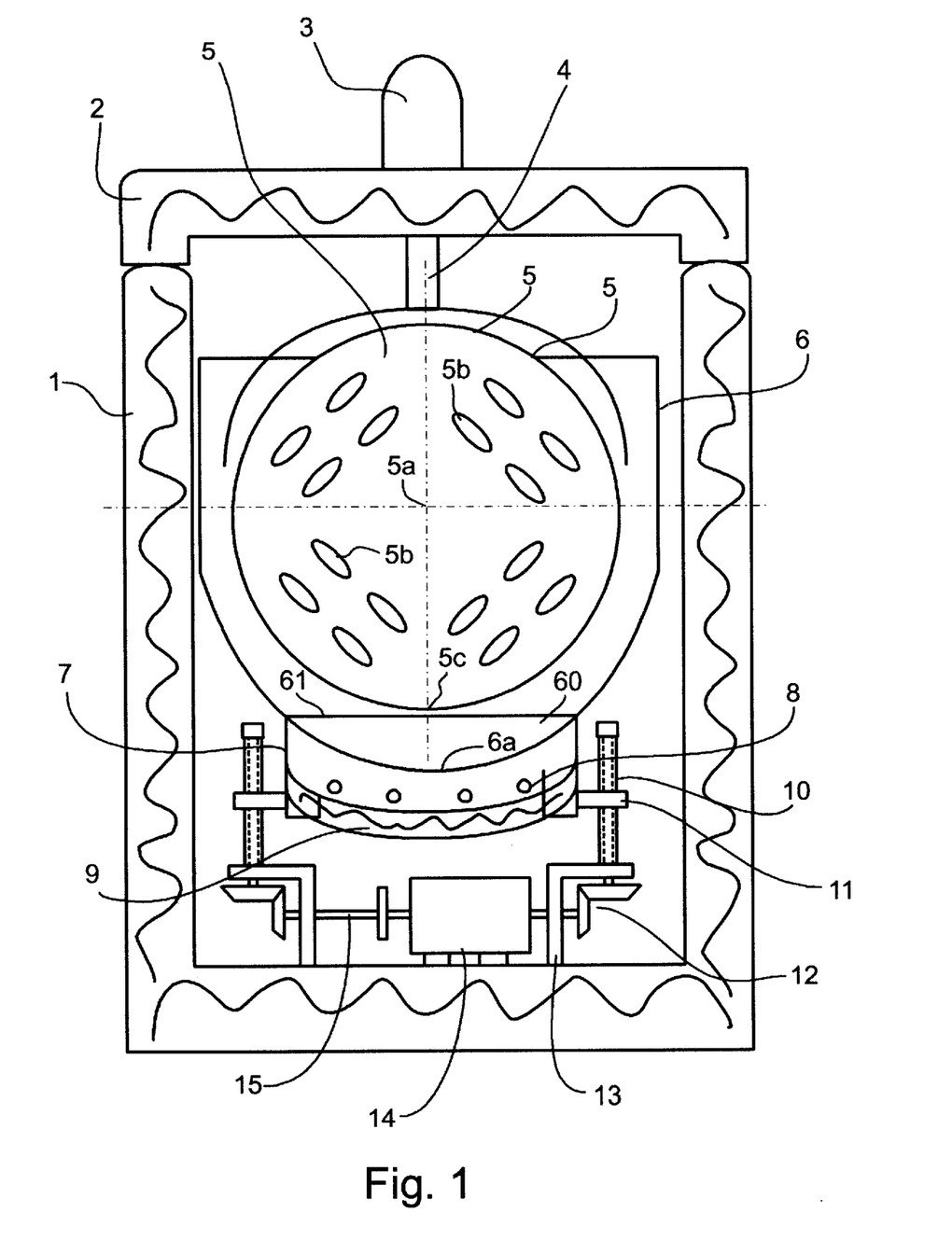
FIG. 1 is a diagrammatic side view illustrating a preferred form of appliance constructed in accordance with the present invention, the liquid container therein being shown in its lowered position.
Figure 2:
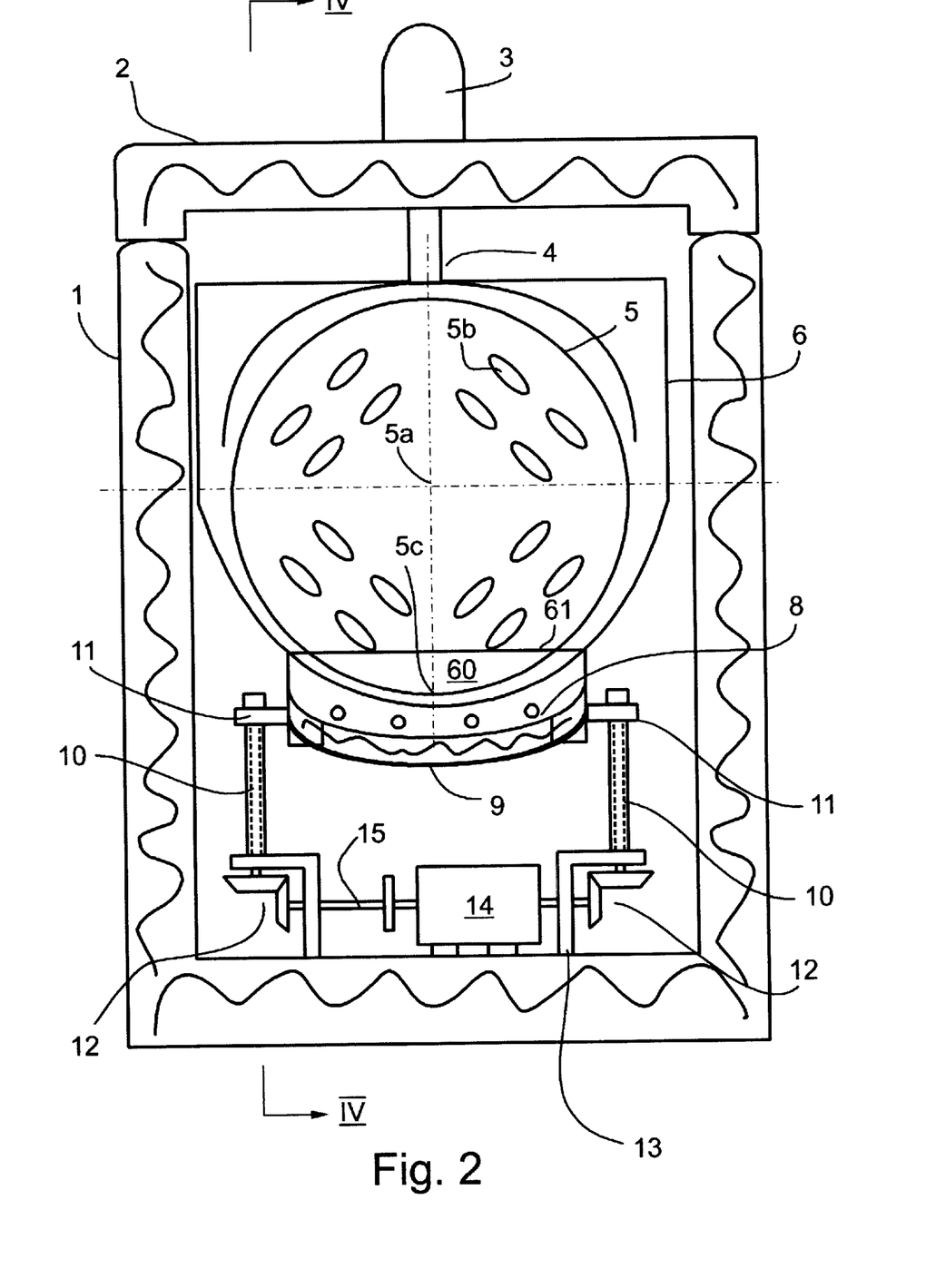
FIG. 2 is a view corresponding to that of FIG. 1 but showing the liquid container in its raised position.
Figure 3:
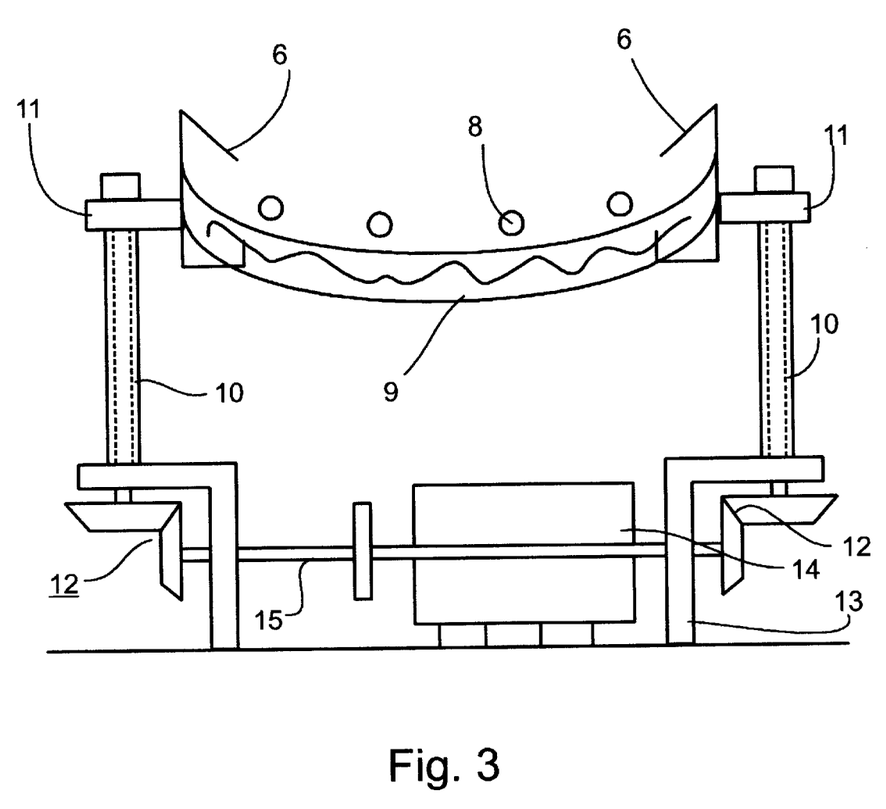
FIG. 3 is an enlarged fragmentary view illustrating the drive for the liquid container.
Figure 4:
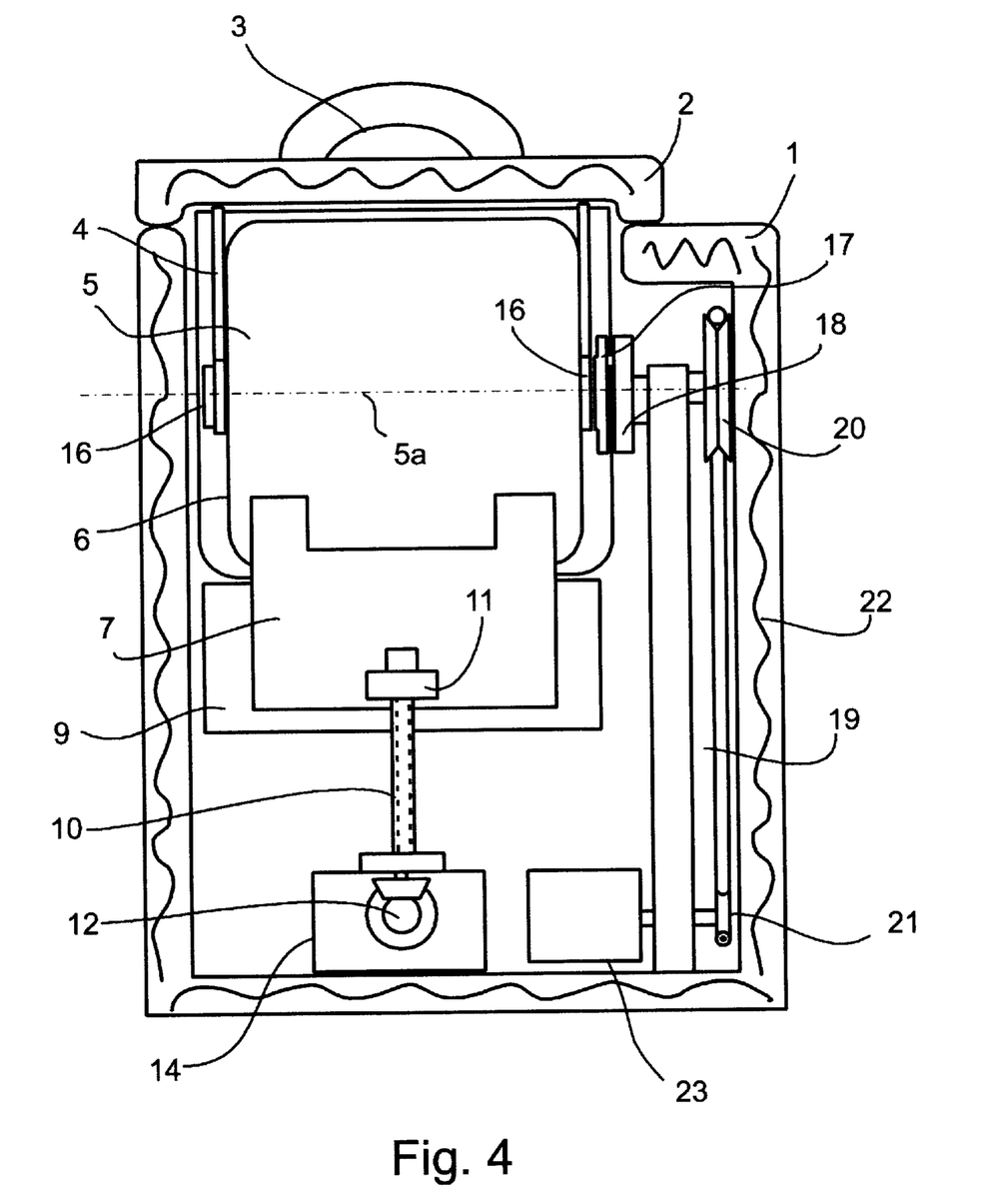
FIG. 4 is a sectional view along IV—IV of FIG. 2.

The liquid container 6 is movable either to a lowered position wherein its bottom 6a is spaced well below the bottom 5c of the rotatable drum 5, as shown in FIG. 1, or to a raised position wherein its bottom 6a is but slight spaced from the drum bottom 5c, as shown in FIG. 2. The raising and lowering of the liquid container is effected by a rotatable screw 10 threadeadly received within a nut 11 on each of the two opposite sides of the container. The two nuts 11 are fixed to the container support 7, whereas the two screws 10 are rotated by gearing 12 rotatably mounted on a supporting member 13 on the two opposite sides of the bottom wall of housing 1. Gearings 12 are driven by electrical motor 14 via shafts 15 extending from the opposite sides of the electrical motor. Thus, motor 14 may be rotated in one direction to lower the liquid container 6 with respect to the drum 5, or may be driven in the opposite direction to raise the container with respect to the drum.

Drum 5 is rotated about its horizontal axis 5a by a second motor 23 mounted at the lower end of the housing 1 and magnetically coupled to the drum 5 via a magnetic coupling. For this purpose, the horizontal rotary shaft 5a of drum 5 is formed with end flanges 16 at its opposite ends. To one end flange 16 is secured a disc 17 carrying a plurality of permanent magnetic elements 17a (FIG. 6) located adjacent to the inner surface of the liquid container 6 in the operative position of the drum. A second disc 18, also carrying a corresponding plurality of magnetic elements, is disposed adjacent to the outer face of the liquid container 6 in alignment with a magnetic disc 17, such that the magnets of the two discs effect a magnetic coupling through the liquid container without piercing the liquid container. The liquid container 6 may be made of any suitable non-magnetic material, such as aluminum or a special grade of stainless steel.

The outer magnetic disc 18 is coupled to the rotary motor 23 via a pulley belt coupling, including a supporting member 19 mounting a pair of pulleys 20, 21 coupled together by a pulley belt 22. The lower pulley 21 is driven by electrical motor 23 via a shaft passing through the pulley belt support 19.

It will be seen that the magnetic coupling, including the two magnet-carrying discs 17, 18, located on opposite sides of the liquid container 6, permits the drum 5 to be conveniently introduced into, or removed from, the interior of the liquid container 6.

Figure 5:
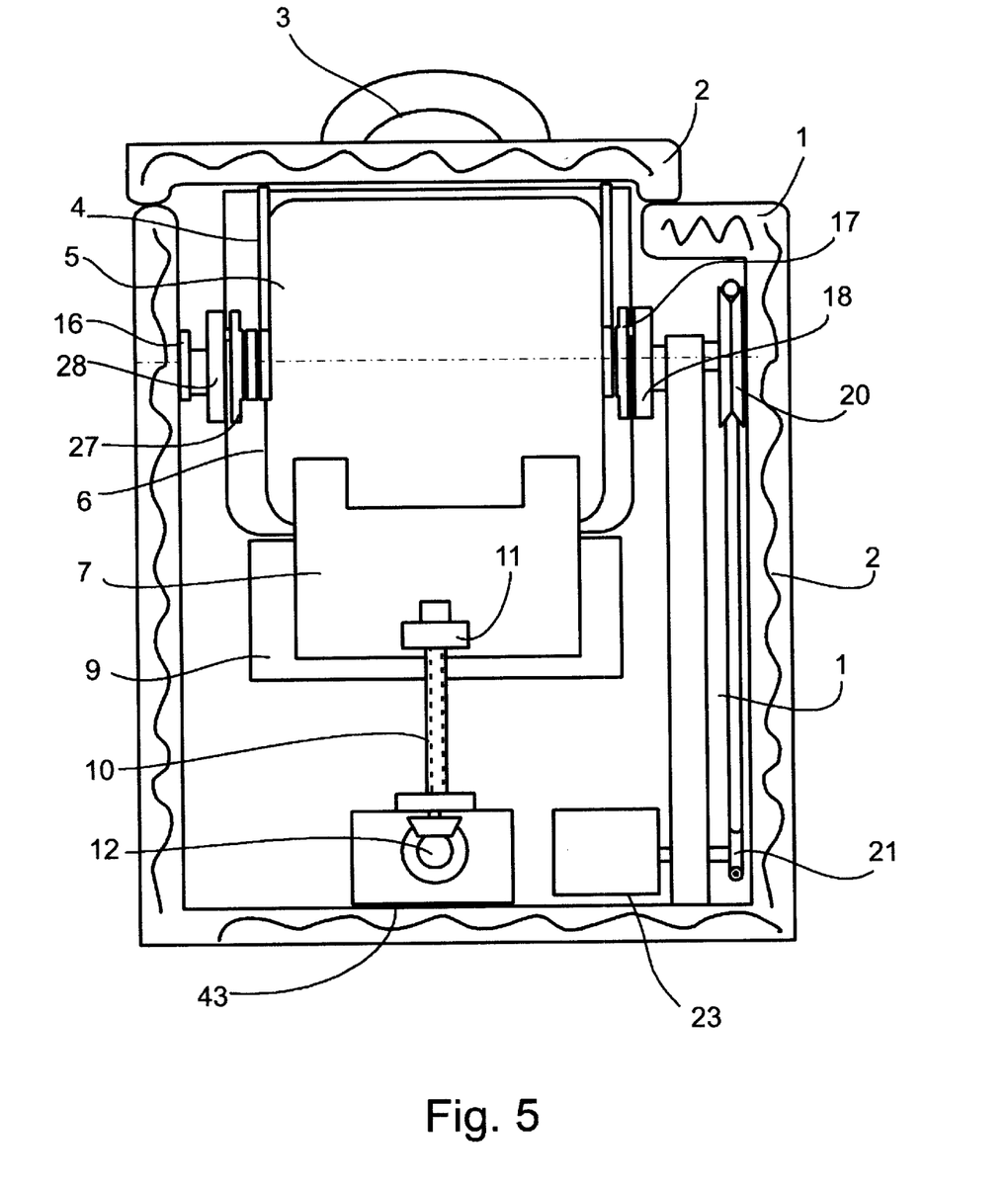
FIG. 5 is a view similar to that of FIG. 4, but illustrating a modification.

FIG. 5 illustrates a variation, wherein the illustrated appliance includes an inner magnetic-carrying disc 27, and an outer magnetic-carrying disc 28, on the opposite side of the drum 5 for purposes of balancing the drum during its rotation, and also for facilitating its removal from the appliance.

Figure 6:
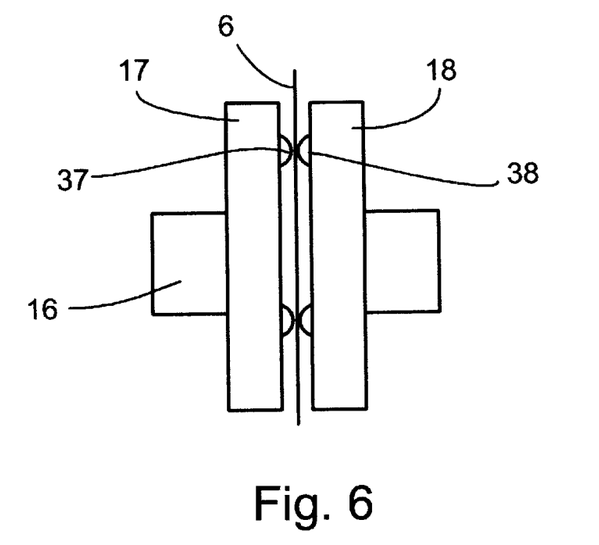
FIG. 6 is a side elevational view illustrating a variation in the magnetic coupling.
Figure 7:
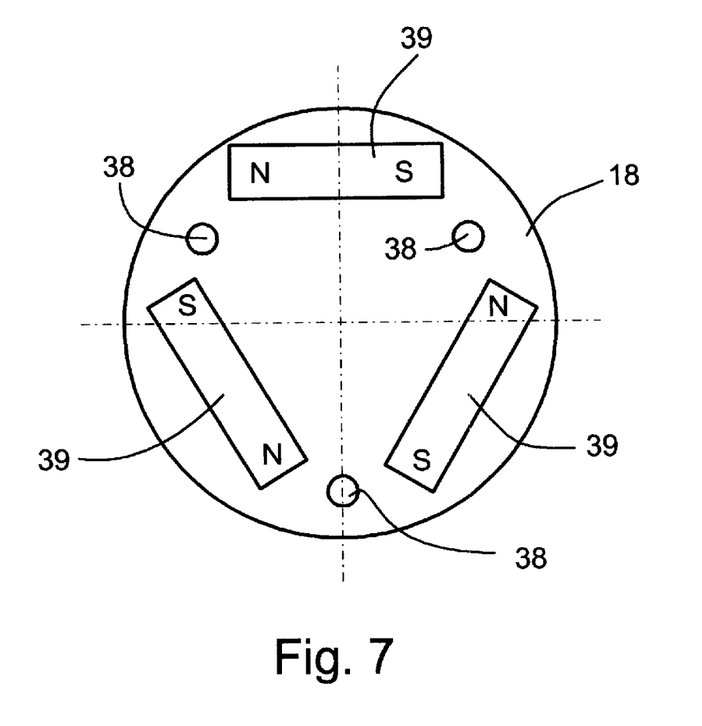
FIG. 7 is an end view of one of the magnetic-coupling discs in FIG. 6.

FIGS. 6 and 7 illustrate another modification that may be used for this purpose. In this modification, each of the magnetic-carrying discs 17, 18, also includes a plurality of low-friction spacer elements, shown at 37, 38, respectively, for closely spacing the respective disc from the respective surface of the liquid container 6. FIG. 7 also illustrates the magnets 39 carried by the disc 18.

Figure 8:
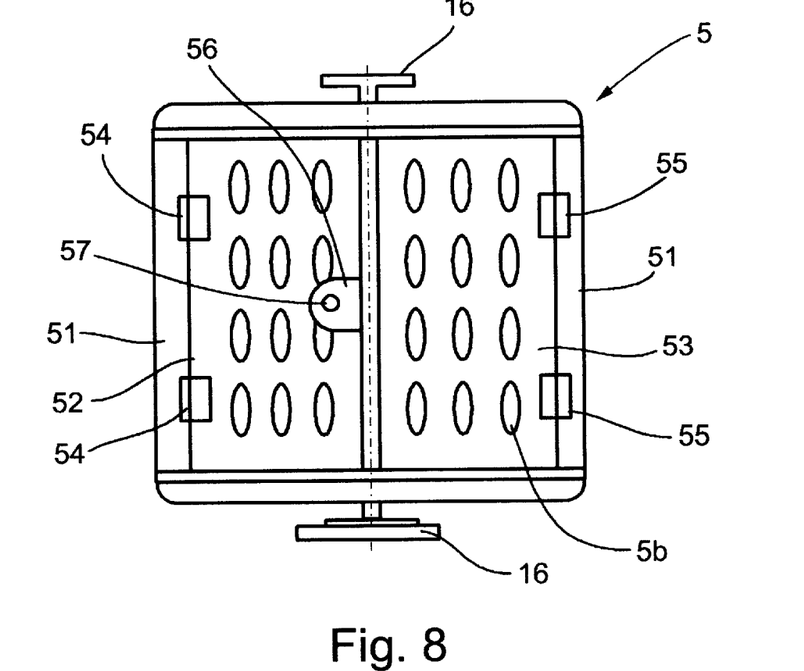
FIG. 8 is a side elevational view more particularly illustrating the rotary drum.
Figure 9:
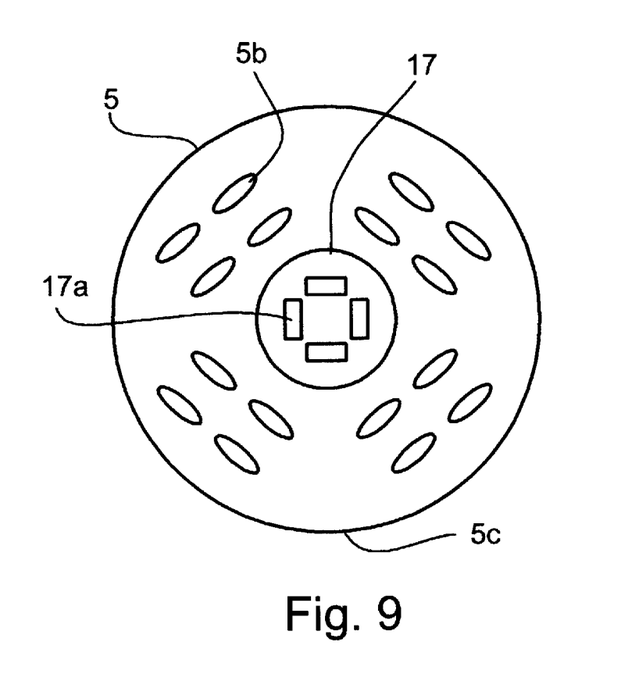
FIG. 9 is an end view more particularly illustrating the drum and its magnetic drive.

For purposes of opening the drum 5 in order to introduce food articles to be cooked, or to remove such food articles after having been cooked, the drum 5 is constructed of a plurality of sections, as shown particularly in FIG. 8. Thus, the drum 5 includes a main section 51, and two openable sections 52, 53 hingedly mounted at 54 and 55, respectively, to the main section 51. Section 53 of the drum is provided with a tongue 56 having an inwardly-extending projection 57 received within a correspondingly-shaped recess (not shown) for retaining the two hinged sections 52, 53 in closed positions, as shown in FIG. 8.

In order to open the drum, tongue 56 is grasped by the user's fingers and pulled outwardly to unseat the projection 57, and thereby to permit the two sections 52, 53 to be pivotted to their open positions.

The illustrated appliance may be used in the following manner:

The food articles are introduced into the drum 5 by first removing the drum from the housing and opening the two hinged sections 52, 53. The drum may be conveniently removed from the housing by merely grasping handle 3 and lifting it with the lid 2 from the upper end of the housing.

If the food articles are to be fried, a small quantity of frying oil is introduced into the liquid container 6 so as to form a shallow pool covering only the bottom 6a of the container, as shown at 60 in FIGS. 1 and 2. Initially, motor 14 is operated to lower the liquid container 6 such that the upper level 61 of the pool of oil 60 on the bottom wall of the container is spaced well below the bottom wall 5c of the drum 5, as shown in FIG. 1. Electrical motor 23 is then operated to rotate the drum 5 about its horizontal axis 5a, and the electrical heaters 8 are energized to heat the bottom wall 6a of the liquid container.

As the drum 5 is rotated, the articles of food therein tumble within the drum while heated by the heat from the oil 60 within the container 6. Since the bottom portion of the drum 5c is spaced above the level 61 of the oil 60 within the bottom 6a of the container 6, the oil does not directly contact the food articles tumbling within the drum, but rather merely heat the food articles indirectly as the food articles tumble within the drum. The food articles are thus pre-heated by the hot frying liquid and the walls of the container 6.

After the food articles have thus been pre-heated, motor 14 is energized to raise the liquid container 6 so that the level 61 of the frying oil 60 within the bottom 6a of the container now partially immerses the bottom portion 5c of the drum 5. Accordingly, as the drum is rotated by motor 23, the food articles tumble into and out of the cooking oil 60 and thus are fried by the oil.

It has been found that pre-heating the food articles, before frying them, causes a substantially smaller amount of frying oil to be absorbed by the food articles. For example, it was found that when the food articles are potato sticks, they absorb approximately 20% by weight of the frying oil when they are fried without pre-heating, but only about 8–12% of the frying oil when pre-heated and then fried as described above.

If the food articles are to be steamed, water, rather than frying oil, is introduced into the bottom of the container 6 also to the level as shown at 61 in FIG. 1. While the container is in its lower position, the water does not directly contact the food articles, as they tumble within the drum during its rotation, but rather are only steamed by the water vapor produced by the electrically heated water in the bottom of the container.

While the invention has been described with respect to several preferred embodiments, it will be appreciated that these are set forth merely for purposes of example, and that many other variations may be made. For example, the drives for rotating the drum, and/or for raising the liquid container, may be manual drives rather than electrical drives. In addition, the drum could also be rotated at a relatively high speed after removal from the oil to spin-off any excess oil. Further, to facilitate lifting the lid with the drum, it may be desirable to provide a lever arrangement, particularly for the initial lifting movement to overcome the magnetic forces. Also, it may be desirable to include a retainer for retaining the oil container to its support to assure that it moves with its support. Many other variations and applications of the invention will be apparent.

What is claimed is:

1. A cooking appliance for cooking food articles by means of a heated cooking liquid, comprising:

a liquid container for receiving a quantity of the cooking liquid;

an electrical heater for heating the cooking liquid;

a perforated rotary drum for receiving the food articles to be cooked;

and a drive for rotating said rotary drum;

characterized in that said liquid container is selectively movable to a raised position, wherein the quantity of the cooking liquid therein directly contacts food articles in the drum, or to a lowered position wherein the quanity of the cooking liquid therein is spaced below the food articles in the drum.

2. The appliance according to claim 1, wherein the appliance includes a further drive for selectively driving the liquid container to the raised and lowered positions.

3. The appliance according to claim 2, wherein said further drive includes an electrical motor, a screw rotated by said electrical motor, and a nut threadedly receiving said screw and fixed to the liquid container to raise or lower the liquid container according to the direction of rotation of the electrical motor.

4. The appliance according to claim 3, wherein said further drive includes a said screw and a said nut on each of the two opposite sides of the electrical motor and the liquid container raised and lowered thereby.

5. The appliance according to claim 1, wherein said electrical heater is removably mounted below the liquid container.

6. The appliance according to claim 1, wherein said electrical heater includes a heating element below and facing the lower surface of the liquid container, and a reflector below the heating element to reflect the heat therefrom towards the lower surface of the liquid container.

7. The appliance according to claim 1, wherein said rotary drum is driven by an electrical drive and is coupled to the electrical drive by a magnetic coupling facilitating the application and removal of the drum from the appliance for introducing and removing food articles to be cooked therein.

8. The appliance according to claim 7, wherein said magnetic coupling includes an inner magnet-carrying disc fixed to the drum adjacent to the inner surface of the liquid container, which disc is magnetically coupled to an outer magnet-carrying disc on the outer surface of the liquid container mechanically coupled to the electrical motor.

9. The appliance according to claim 8, wherein the appliance includes a said inner magnetic-carrying disc and a said outer magnetic-carrying disc on each of the opposite ends of said drum for balancing purposes.

10. The appliance according to claim 8, wherein each of said magnetic-carrying discs includes a plurality of low-friction spacer elements for closely spacing the respective disc from the respective surface of the liquid container.

11. A cooking appliance for cooking food articles by means of a heated cooking liquid, comprising:

a liquid container for receiving a quantity of the cooking liquid;

an electrical heater for heating the cooking liquid;

a perforated rotary drum rotated about a horizontal axis for receiving the food articles to be cooked;

an electrical drive for rotating said rotary drum about its horizontal axis;

and a further electrical drive for selectively driving said liquid container to a raised position wherein the quantity of the cooking liquid therein directly contacts the food articles in the drum, or a lowered position wherein the quantity of the cooking liquid therein is spaced below the food articles in the drum.

12. The appliance according to claim 11, wherein said further electrical drive includes an electrical motor, a screw coupled to the electrical motor on each of two opposite sides, and a nut secured to each of the two opposite sides of the liquid container and threadedly receiving one of said screws.

13. The appliance according to claim 11, wherein said electrical heater is removably mounted below the liquid container.

14. The appliance according to claim 11, wherein said electrical heater includes a heating element below and facing the lower surface of the liquid container, and a reflector below the heating element to reflect the heat therefrom towards the lower surface of the liquid container.

15. The appliance according to claim 14, wherein said rotary drum is coupled to the electrical drive by a magnetic coupling facilitating the application and removal of the drum from the appliance for introducing and removing food articles to be cooked therein.

16. The appliance according to claim 15, wherein said magnetic coupling includes an inner magnetic-carrying disc fixed to the drum adjacent to the inner surface of the liquid container, which disc is magnetically coupled to an outer magnetic-carrying disc on the outer surface of the liquid container mechanically coupled to the electrical motor.

\* \* \* \* \*